United States Patent [19]

Bricot et al.

[11] 3,919,698

[45] Nov. 11, 1975

[54] METHOD OF REDUCING THE OPTICAL NOISE PRODUCED BY A MOTION ON AN ILLUMINATED SURFACE, AND OPTICAL DEVICES FOR IMPLEMENTING SAID METHOD

[75] Inventors: Claude Bricot; Jean-Pierre Lacotte; Francois Le Carvennec; Jean-Claude Lehureau; Jean-Pierre Le Merer, all of Paris, France

[73] Assignee: Thomson-Brandt, Paris, France

[22] Filed: Mar. 18, 1974

[21] Appl. No.: 452,443

[30] Foreign Application Priority Data

Mar. 21, 1973 France .............................. 73.10142

[52] U.S. Cl. ... 340/173 LM; 179/100.3 G; 250/566

[51] Int. Cl.[2] ..................... G11C 13/04; G11C 7/02

[58] Field of Search............... 340/173 LM, 173 LT; 179/100.3 G; 350/3.5; 250/566

[56] References Cited

UNITED STATES PATENTS 3,727,195 4/1973 McLaughlin................. 340/173 LM 3,798,618 3/1974 Oshida......................... 340/173 LM

OTHER PUBLICATIONS

Pohl, Holographic Memory with Rapid Access, IBM Technical Disclosure Bulletin, Vol. 15, No. 5, 10/72, p. 1557.

Smith, Large Capacity Holographic Memory, IBM Technical Disclosure Bulletin, Vol. 15, No. 3, Aug. 1972, p. 767.

*Primary Examiner*—Stuart N. Hecker

*Attorney, Agent, or Firm*—Cushman, Darby & Cushman

[57] ABSTRACT

The present invention consists in introducing between a laser acting as an illumination source and a moving recording surface, a quarter-wave plate whose neutral axes are disposed at 45° to the plane of polarisation of the rectilinearly polarised light emitted by the laser; the optical noise introduced by the vibrations and surface irregularities in the moving surface which, in association with the exit face of the laser, defines a resonant cavity of randomly varying length, can thus be considerably reduced.

6 Claims, 1 Drawing Figure

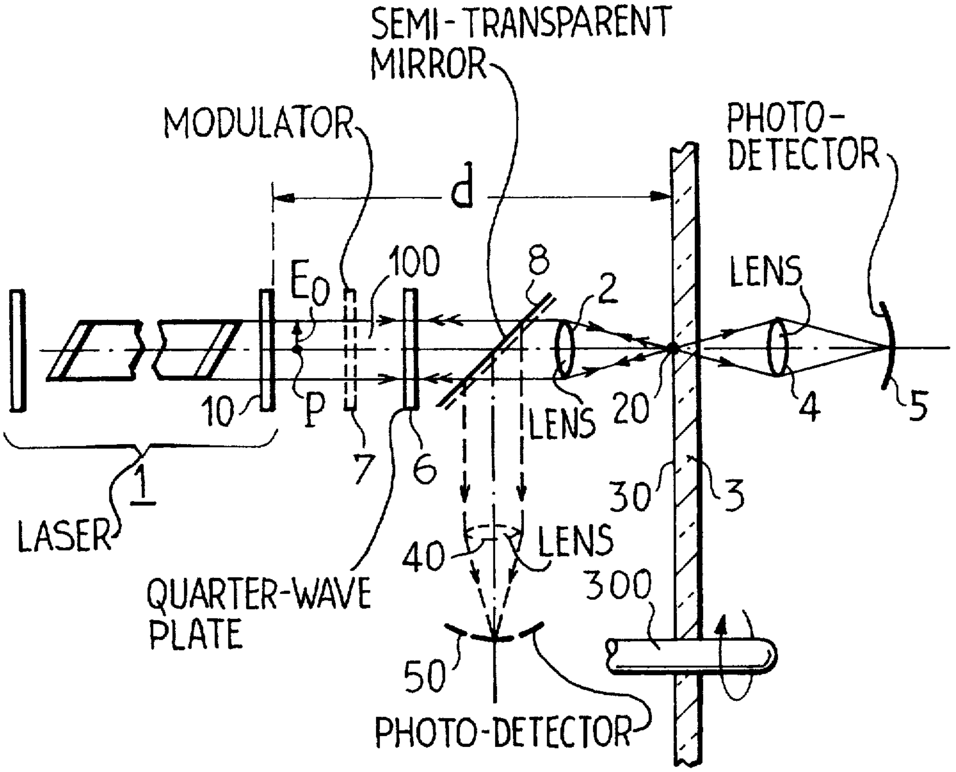
SEMI-TRANSPARENT MIRROR
MODULATOR
PHOTO-DETECTOR
d
E0
100
8
2
LENS
10
P
7
6
LENS
20
4
5
1
LASER
30
3
40
LENS
QUARTER-WAVE PLATE
300
50
PHOTO-DETECTOR

METHOD OF REDUCING THE OPTICAL NOISE PRODUCED BY A MOTION ON AN ILLUMINATED SURFACE, AND OPTICAL DEVICES FOR IMPLEMENTING SAID METHOD

The present invention relates to a method of reducing optical noise introduced by vibrations or relief irregularities in a moving surface, when said surface is being illuminated by rectilinearly polarised radiation and to optical recording and read-out devices utilizing such a method.

A frequent technique employed in optics is to concentrate a light beam at normal incidence on a moving surface, in particular in order to record information on said surface or to read out information previously recorded there. It is therefore frequently necessary, in order to achieve the highest possible luminous intensity, to utilise coherent light sources which very generally produce rectilinearly polarised radiation. Offset against the luminosity gain which is thus obtained, however, there is the fact that vibrations on the part of the surface, or relief irregularities occurring therein, introduce a random modulation in the intensity of the illuminating beam. This random modulation, or optical noise as it is sometimes known, is due to the fact that the exit face of the laser, and the surface, both being perpendicular to the mean direction of the beam, define a resonant cavity thus constituting a multiple wave interferometer in which the wavelength varies in a randomway as the substrate or data-carrier moves, due to the mechanical vibrations or surface irregularities thereof. These successively reflected waves can only interfere with each other if the coherence wavelength of the light constituting the beam is long compared with the length of the cavity; thus, optical noise is essentially produced by coherent light sources; it is the more noticeable the higher the reflection factor of the substrate.

In order to achieve a considerable reduction in this optical noise phenomenon, the invention proposes that a quarterwave plate should be arranged in the trajectory of the beam, between the exit face of the laser and the substrate which is to be illuminated.

For a better understanding of the invention, and to show how the same may be carried into effect, reference will be made to the ensuing description and the attached FIGURE illustrating the device in accordance with the invention.

In the FIGURE, which shows an embodiement of the device in accordance with the invention, there can be seen a laser 1, with an exit fact 10 from which there emerges a parallel beam of coherent light, 100, rectilinearly polarised in accordance with the direction $E_o$; an objective lens 2 concentrates the beam 100 at a point 20 located on the opposite face 30 of a transparent plate 3 parallel to the exit face 10 of the laser; the divergent beam which has passed through the substrate 3, is concentrated once again by the objective lens 4, on the photoelectric detector 5. The plate 3 may for example be a disc of transparent material rotating about its axis 300 and provided on the face 30, opposite the objective lens 2, with information previously recorded there in some form or other (transparency variation for example); as the disc passes before the point of focus 20, it modulates the intensity of the light beam and the detector transcribes these variations in luminous intensity to variations in electrical current.

In this very conventional optical read-out device, any variation in the intensity of the signal, independently of the information recorded on the plate 3, will disturb the signal measured by the photo-detector and will constitute a noise component which it is essential to reduce as much as possible.

With this object, the invention proposes that there should be placed between the exit face 10 of the laser and the plate 3, and if possible between the face 10 and the lens 2, that is to say in the region where the beam is a parallel beam, a double-refracting plate 6 designed as a quarter-wave plate for the radiation emitted by the laser. The neutral axes of the double-refracting plate are arranged at 45° to the direction of polarisation $E_o$ of the laser.

The assembly formed by the exit face 10, which is generally a mirror having a reflection factor very close to unity for the radiation emitted by the laser, and by the parallel face 30 which has a reflection factor $R = r^2$, constitutes a resonant cavity. It is proposed to demonstrate hereinafter that this resonant cavity effect, and the optical noise which it produces, are substantially diminished by the interposition of the quarter-wave plate 6.

We will indicate the instantaneous amplitude of the flat rectilinearly polarised wave, measured at an arbitrary point P in the absence of the plate 3 and the double-refracting plate 6, by the real part of the expression $E_o \exp(i\omega t)$.

During a first period, we will assume that the substrate 3 is arranged in the path of the beam, as indicated in the FIGURE, while the plate 6 is not.

The flat wave emitted by the laser and transmitted by the objective lens 2 having a transmission factor T, experiences a first reflection at the face 30, being reflected back on itself and passing back through the objective lens again, following which it is reflected by the face 10 and returns to the point $P$ with an instantaneous amplitude of:

$$E_o\, Tr \exp i(\omega t - p)$$

where $p = 4\pi d/\lambda$, if $d$ is the distance between the two faces 3 and 30 and $\lambda$ the wavelength of the radiation emitted by the laser.

By the same mechanism, said first reflected wave gives rise to a second reflected wave of instantaneous amplitude at $P$, as follows:

$$E_o\, T^2r^2 \exp i(\omega t - 2p)$$

and so on.

These various flat waves, which have the same polarisation direction, are superimposed at the point $P$ and yield a resultant vibration:

$$E_o \exp i\omega t\,[1 + Tr \exp(-ip) + T^2r^2 \exp(-2ip) + \ldots]$$

the intensity $I_l$ of which, according to the well-known multiple wave interferometer theory, is given by:

$$I_l \quad \frac{E_o}{1 + T^2r^2 - 2Tr \cos p}$$

However, the value of the phaseshift $p$, associated with the distance $d$, is never strictly constant for distances on the order of the wavelength, once the substrate 3 is in motion. Indeed, the mechanical vibrations of the plate or surface irregularities which it exhibits, result in random variations in the value of $d$ and therefore of $p$.

The intensity $I_1$ thus varies in a random way between the two extreme values:

$$I_{1M} = \frac{E_o^2}{(1 - Tr)^2}$$

10 and $$I_{1m} = \frac{E_o^2}{(1 + Tr)^2}$$

The maximum variation in the intensity of the radiation picked up at the cavity exit, independently of the information recorded on the substrate 3, thus has the value:

$$I_{1M} - I_{1m} = \frac{4\,Tr}{(1 - T^2r^2)^2}\,E_o^2$$

this corresponding to a noise power $B_1$:

$$B_1 = \frac{\sqrt{2}\,Tr}{(1 - T^2r^2)^2}\,E_o^2$$

and to a signal-to-noise ratio of:

$$(S/B)_1 = \frac{\sqrt{2}\,(1 - T^2r^2)^2}{2\,Tr}$$

The introduction of the quarter-wave plate 6 into the cavity, fundamentally modifies the superimposition of the reflected waves.

Each reflective wave, after twice having passed through the quarter-wave plate, rotates through 90° in relation to the incident wave which gave rise to it; thus the even order reflected waves are in the same plane of polarisation as the initial wave, while the odd order reflected waves are in a plane perpendicular to the first. The result is an elliptical polarised wave whose two components respectively have the amplitudes:

$A_1 = E_o \exp(i\omega t)\,[1 + T^2r^2 \exp(-2lp) + T^4r^4 \exp(-4ip) + \ldots]$ in the plane of polarisation of the initial wave, and $A_p = E_o \exp(i\omega t)[\mathrm{Tr} \exp(-ip) + T^3r^3 \exp(-3ip) + \ldots]$ in the plane of polarisation perpendicular to the former.

The luminous intensity $I_2$ of this elliptically polarised wave is the sum of the squares of the amplitudes of the two component rectilinearly polarised waves, or in other words:

$I_2 = A_l^2 + A_p2$ where:

$$I_2 = \frac{E_o^2\,(1 + T^2r^2)}{1 + T^4r^4 - 2T^2r^2\cos 2p}$$

The intensity $I_2$ thus varies randomly between the two extreme values:

$$I_{2M} = \frac{1 + T^2r^2}{(1 - T^2r^2)^2}$$

and:

$$I_{2m} = \frac{1 + T^2r^2}{(1 + T^2r^2)^2}$$

The maximum interval between these two values is:

$$I_{2M} - I_{2m} = \frac{4T^2r^2\,(1 + T^2r^2)}{(1 - T^4r^4)^2}$$

this corresponding to a noise power $B_2$ of:

$$B_2 = \frac{2\,T^2r^2\,(1 + T^2r^2)}{(1 - T^4r^4)^2}$$

and to a signal-to-noise ratio of:

$$(S/B) = \frac{2\,(1 - T^4r^4)^2}{2\,T^2r^2}$$

Comparing the noise values and the signal-to-noise ratio, with and without the quarter-wave plate, it will be seen that since the values of $T$ and $R = r^2$ are by definition less than unity, the presence of the quarter-wave plate makes it possible to reduce the noise and improve the signal-to-noise ratio.

The same result could be achieved by replacing the quarter-wave plate with a double-refracting plate having the same orientation in relation to the plane of polarisation of the light emitted by the laser, but introducing between two waves propagating parallel to its neutral axes, a phase difference equal to an odd multiple of a quarter of the wavelength used (three-quarter-wave plate for example).

Another example of the implementation of the method of the invention, likewise shown in the FIGURE, is concerned with the read-out by reflection, of a signal recorded upon the face 30 of the disc 3; a semi-transparent mirror 8 then directs part of the radiation reflected by the face 30, onto the photo-detector 50 through the lens 40.

The same method can also be used to reduce the optical noise at the time of recording a light signal on a photosensitive surface. As the FIGURE also shows, a modulator 7 is then arranged in the path of the recording beam 100, and the disc 3 is covered on the face 30 with a photo-sensitive film; the objective lens 4 and the photo-detector 5 are then discarded.

By way of an example of application, let us consider the case where the substrate utilised, which is being scanned by transmission, is a glass plate with a reflection factor of $R = 0.04$ (or $r = 0.2$) and where the optical device illuminating the substrate has a transmission factor of $T = 0.5$. The product $Tr$ is thus equal to 0.1 and the signal-to-noise ratio changes from the value $$(S/B)_1 = 2/\ \sqrt{2} \times 0.1 = 7$$

in the absence of the quarter-wave plate, to the value:

$$(S/B)_2 = 2/\ \sqrt{2} \times 0.01 = 70$$

when the quarter-wave plate is arranged in the illuminating device.

What I claim is:

1. A method of reducing optical noise in an optical system comprising an illumination source emitting a beam of rectilinearly polarised radiation, and a flat surface moving perpendicularly to said beam, said method consisting in placing between said illumination source and said moving surface, a double-refracting plate; said double-refracting plate having neutral axes arranged at 45° to the plane of polarisation of said source and producing, between two vibrations propagating parallel to said neutral axes, a phaseshift equal to an odd multiple of a quarter of the wavelength of emission of said source.

2. A device designed to optically record information upon a moving substrate, comprising a source of radiation, a modulator for modulating said radiation and means for reducing optical noise; said means including a double-refracting plate; said double-refracting plate being located between said moving substrate and said source, having its neutral axes arranged at 45° to the plane of polarisation of said source and introducing, between two vibrations propagating parallel to said neutral axes, a phase-shift equal to an odd multiple of a quarter of the wavelength of emission of said source.

3. A device as claimed in claim 2, further comprising optical means for concentrating said radiation onto said substrate.

4. A device for optical read-out of the information stored at the surface of a moving substrate, comprising a source of radiation, means for detecting a fraction of said radiation emerging from said moving substrate and means for reducing optical noise; said means including a double refracting plate; said double-refracting plate being arranged between said source and said moving substrate, having its neutral axes disposed at 45° to the plane of polarisation of said source and introducing between two vibrations propagating parallel to said neutral axes, a phase-shift equal to an odd multiple of a quarter of the wavelength of emission of said source.

5. A device as claimed in claim 4, further comprising optical means for concentrating said radiation onto said substrate.

6. A device as claimed in claim 4, further comprising optical means which concentrate said radiation on said moving substrate.

* * * * *